United States Patent [19]

Grishaev et al.

[11] 3,944,048
[45] Mar. 16, 1976

[54] MECHANISM FOR LOADING LAMP CAPS INTO THE CELLS OF AN ENDLESS CHAIN CONVEYOR

[76] Inventors: Gennady Ivanovich Grishaev, prospekt 50 let Oktyabrya, 103, kv. 15; Nikolai Ivanovich Tsygankin, ulitsa Anny Iuss, 2, kv. 25, both of Saransk, MASSR, U.S.S.R.

[22] Filed: Apr. 2, 1975

[21] Appl. No.: 564,355

[52] U.S. Cl. .................. 198/25; 198/26; 198/103; 198/209
[51] Int. Cl.² ........................................ B65G 47/00
[58] Field of Search .............. 198/25, 103, 209, 26

[56] References Cited
UNITED STATES PATENTS

| | | | |
|---|---|---|---|
| 1,770,530 | 7/1930 | Oslund | 198/25 X |
| 2,858,862 | 11/1958 | Francisco | 198/25 X |

FOREIGN PATENTS OR APPLICATIONS

| | | | |
|---|---|---|---|
| 812,477 | 5/1937 | France | 198/25 |

*Primary Examiner*—Evon C. Blunk
*Assistant Examiner*—Douglas D. Watts
*Attorney, Agent, or Firm*—Haseltine, Lake & Waters

[57] ABSTRACT

A mechanism for loading lamp caps into the cells of an endless chain conveyor (the mechanism is designed for use in a lamp cap smearing installation). In this mechanism, between a rotor, which carries lamp caps to the cells of the chain conveyor, and a stationary guide arranged to accumulate lamp caps are fitted a spring-loaded retainer and a means for positively moving lamp caps from the stationary guide into the rotor slots. The spring-loaded retainer prevents the lamp caps from leaving the guide and periodically, when a lamp cap is fed into a rotor slot, is positively moved out of the retaining position. This constructional arrangement provides for sure feeding of lamp caps into the conveyor cells practically at any conveyor speed.

5 Claims, 3 Drawing Figures

MECHANISM FOR LOADING LAMP CAPS INTO THE CELLS OF AN ENDLESS CHAIN CONVEYOR

The present invention relates to electrical engineering equipment employed in manufacturing electrovacuum apparatus, for example, incandescent lamps and has particular reference to a mechanism for loading lamp caps into the cells of an endless chain conveyor. The mechanism which constitutes the present invention can be used in an automatic cap smearing installation.

Known in the art is a mechanism for loading lamp caps into the cells of an endless chain conveyor, which mechanism comprises an endless chain conveyor, a stationary guide to accommodate a row of lamp caps, and a vertical support. Mounted on said vertical support is a rotor with radial slots arranged to receive one lamp cap each. Also mounted on the vertical support is a stationary plate serving as a bottom cover of the rotor slots in the portion of the rotor travel which carries lamp caps to the conveyor cells, said stationary plate having a shoulder extending over the side of the rotor.

In the mechanism under consideration, the rotor slots are small-sized and the individual lamp caps move into the rotor slots under the weight of the entire row of the lamp caps. Therefore, with the rotor turning continuously, a cap fed from the stationary guide may be early or late in arriving at the slot, with consequent failure to enter the rotor slot completely.

If one half of the cap diameter enters the slot, the cap becomes jammed between the rotor side and the shoulder of the stationary plate, which entails cap mutilation and may result in breakdown of the entire mechanism. If less than one half of the cap diameter enters the slot, the cap is ejected into the stationary guide during the rotor movement. The rotor slot remains empty and the rotor fails to load the appropriate conveyor cell, thereby adversely affecting the working efficiency of the installation.

Increasing the size of the slots gives no improvement inasmuch as the cap is caused to change its position inside the slot by being dragged on the bottom cover. Since the distance from the slot bottom end to the conveyor cell is less than the cap height, the cap cannot right up during the fall into the cell and comes there sidewise, upsetting the operation of the entire installation.

It is an object of this invention to provide a mechanism for loading lamp caps into the cells of an endless chain conveyor, the working efficiency and dependability of said mechanism being materially increased by provision of means for surely feeding each lamp cap into the rotor slots.

With this and other objects in view, there is provided a mechanism for loading lamp caps into the cells of an endless chain conveyor, said mechanism comprising a stationary guide arranged to accommodate lamp caps in a line, one behind the other; a rotor adapted to be driven from said chain conveyor and provided with radial slots to accommodate lamp caps and feed them into the cells of the chain conveyor; and a stationary plate located underneath the rotor for the purpose of serving as a bottom cover of the rotor slots in the portion of the rotor travel which carries lamp caps to the conveyor cells, said stationary plate having a shoulder extending over the side of the rotor.

According to the invention, provided between the rotor and the stationary guide is a spring-loaded retainer which serves the purpose of retaining lamp caps in said stationary guide and is adapted to be positively moved out of the retaining position at periodic intervals, when a slot of the rotor arrives at the stationary guide. Also provided between the rotor and the stationary guide is a means for positively moving a lamp cap from the stationary guide into the rotor slot. The rotor is provided with cams arranged to periodically act upon said retainer in order to positively move it out of the retaining position.

The use of the retainer between the rotor and the stationary guide provides for accurate and properly timed communication between the guide and the rotor slots. The means for positively moving lamp caps provides for surely moving lamp caps into each rotor slot.

An important feature of the invention consists in that one of the walls of each rotor slot is curved in the direction of rotor movement, the curvature being formed so as to blend smoothly with the rotor side. Such a slot shape enables each lamp cap to rapidly enter the rotor slot, the speed of rotor movement being increased accordingly.

A further important feature of the invention consists in that two flat springs are provided in the portion of the rotor travel which carries lamp caps to the conveyor cells. One of said flat springs is attached to the shoulder of the stationary plate and is located in a vertical plane between the rotor side and said shoulder for the purpose of keeping the lamp cap upright in the rotor slot. The other flat spring is attached to a fixedly mounted bracket and is located in a horizontal plane above the rotor slots for the purpose of limiting the vertical movement of the lamp cap in the rotor slot.

Said flat springs keep each lamp cap in a strictly vertical position and prevent the possibility of a lamp cap cocking or tumbling sidewise, thereby providing for faultless operation of the entire installation.

A still further important feature of the invention consists in that the retainer has a pivot pin fixedly mounted on a bracket and a body which is rotatably mounted on said pivot pin and mounts a rod located between the rotor and the stationary guide and a lever carrying a roller and adapted to be periodically acted upon by the rotor cams.

A still further important feature of the invention consists in that the means for positively moving lamp caps comprises a pipe which has a nozzle and is connected to a system supplying compressed air for moving lamp caps.

The aforementioned constructional features of the invention provide for sure feeding of lamp caps into the conveyor cells practically at any conveyor speeds.

Now the invention will be described in detail with reference to the accompanying drawings in which.

Figure 1:
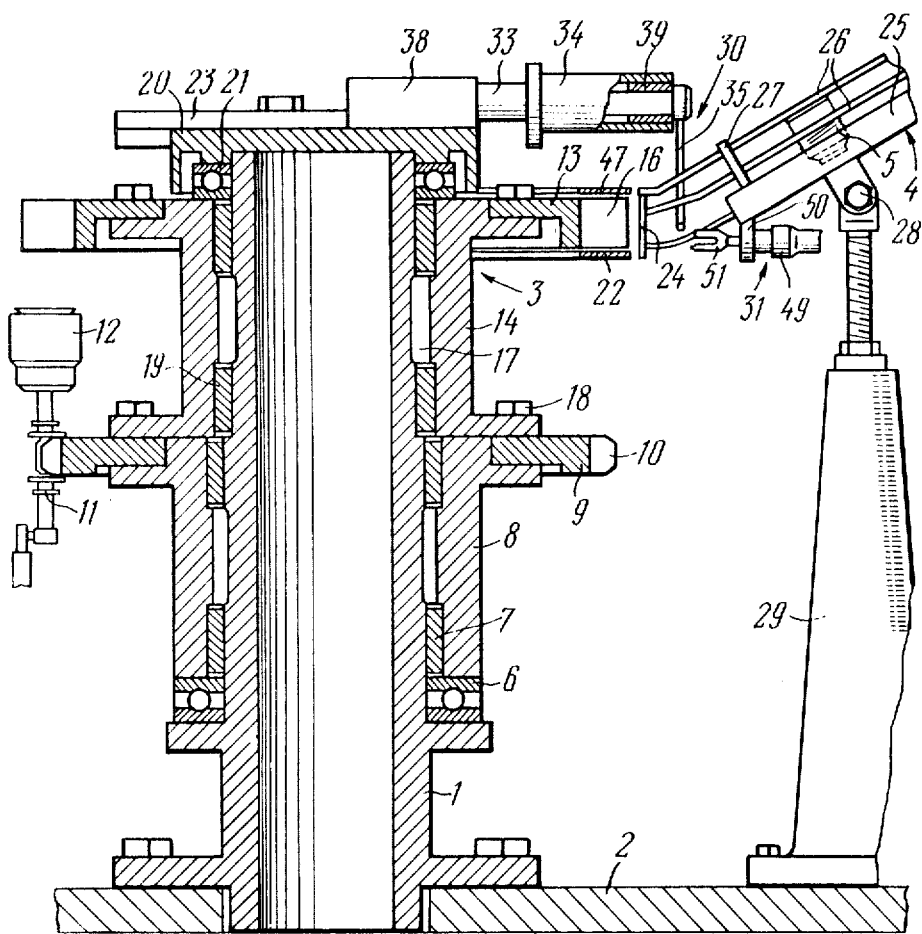
FIG. 1 is a partial longitudinal sectional view of the mechanism for loading lamp caps.

The mechanism for loading lamp caps comprises a vertical support 1 (FIG. 1) fixedly mounted on a base 2, a rotor 3 and a stationary guide 4 arranged to accommodate lamp caps 5 in a line, one behind the other. The lamp caps are fed from a hopper (not shown).

A hub 8 with a sprocket 9 is rotatably mounted in antifriction bearings 6 and bushes 7 installed on the support 1. The teeth 10 of the sprocket 9 are engaged with an endless chain conveyor 11. Cells 12 for carrying the lamp caps 5 are installed vertically in the links of the chain conveyor 11.

The endless chain conveyor 11 is a means of carrying lamp caps from one mechanism to another, for example, in an automatic smearing installation.

The rotor 3 includes a disk 13 fixedly mounted on a hub 14. Through slots 16 open at the outward end are provided in the rotor side 15 (FIG. 2) for the purpose of accommodating lamp caps 5 (FIG. 1) and carrying them into the cells 12 of the conveyor 11. The hub 14 is mounted on the support 1 with a clearance 17. The sprocket 9 is attached to the hub 14 by means of any fastening elements known in the art, for example, bolts 18. Plain bearings 19 located in the clearance 17 enable the rotor 3 to freely turn on the support 1.

Fitted on the top of the support 1 is a cover 20. A bearing 21 fitted between the cover 20 and the disk 13 prevents transmission of the rotational movement from the disk to the cover.

Mounted on the support 1 immediately underneath the disk 13 is a stationary plate 22 which serves as a bottom cover of the slots 16 in the portion of the rotor travel which carries lamp caps to the conveyor cells 12. The plate 22 can be arc-shaped as shown by the broken line in FIG. 2 or made in the form of a disk having a hole located over the conveyor cells (not shown).

The plate 22 is attached to brackets 23 mounted on the support 1 and has a shoulder 24 extending over the side 15 of the disk 13.

The stationary guide 4 (FIG. 1) is essentially a delivery passage formed by a trough 25. The side walls of this trough are made up of rods 26 tied up by means of plates 27. This construction of the trough side walls provides for visual observation of the position of lamp caps 5 in the guide 4.

For lamp caps to have an orientated movement in the guide 4 under their own weight, the guide 4 is mounted in an inclined position on a vertical bracket 29 to which it is secured by means of a bolt 28.

According to the invention, fitted between the disk 13 and the stationary guide 4 is a spring-loaded retainer 30 and a means 31 for positively moving the lamp caps 5 from the stationary guide 4 into the slots 16 provided in the rotor 3.

The spring-loaded retainer 30 is designed to prevent the lamp caps 5 from leaving the guide 4. Periodically, when a rotor slot arrives at the stationary guide 4, the retainer 30 is moved out of the retaining position by a cam 32 (FIG. 2) which is mounted on the disk 13 and is arranged to periodically act upon the retainer 30.

The retainer 30 can be made in a variety of constructional forms. For example, it comprises a fixed pivot pin 33 and a body 34 which carries a rod 35 and a lever 36 with a roller 37 mounted thereon. The pivot pin 33 (FIG. 1) is carried by a bracket 38 mounted on the cover 20. The body 34 is rotatably mounted on the pivot pin 33 by means of bearings 39.

The rod 35 and the lever 36 are mounted on the body 34 (FIG. 2) so that they point in different directions. One end of the rod 35 is secured with a screw 40 to a projection 41 provided on the body 34. The free end of the rod 35 is located between the disk 13 and the guide 4, i.e. in the way by which the lamp caps leave the guide.

One end of the lever 36 is attached to the body 34. The free end of the lever 36 carries a pin 42 with the roller 37 mounted thereon. The disk 13 has cams 32 attached thereto. The number of the cams 32 corresponds with the number of the slots 16. Each cam 32 periodically acts upon the roller 37, giving a turn to the body 34, whereby the rod 35 is moved away from the guide 4, allowing the lamp caps to leave the guide.

The body 34 is connected by means of a tension spring 43 with a plate 44 attached to the bracket 23 which is fixedly mounted on the cover 20. After the lamp cap enters the slot 16 in the disk 13, the retainer is brought back into the initial position by the action of the spring 43.

Figure 2:
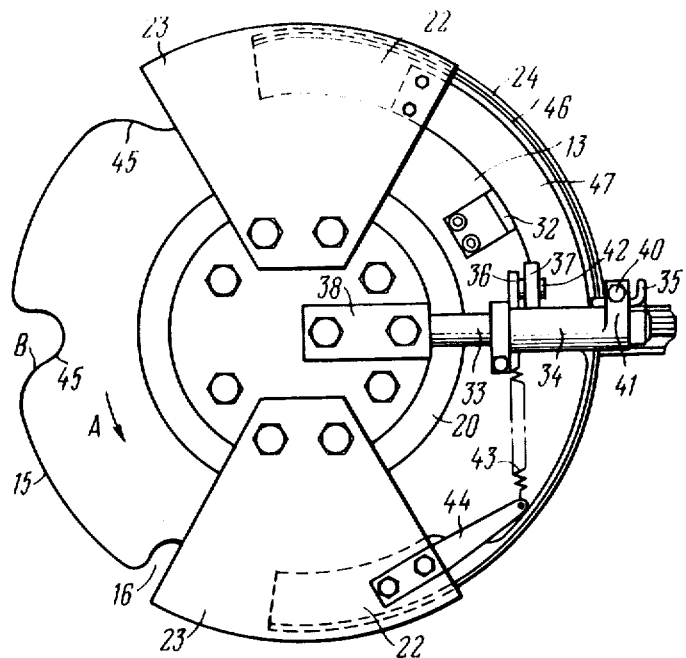
FIG. 2 is a top view of the mechanism for loading lamp caps.

To enable the lamp caps to enter the rotor slots rapidly and smoothly, the side wall 45 of the slot 16 is curved in the direction of rotor movement indicated by the arrow A in FIG. 2. The curvature B is formed so as to blend smoothly with the side 15 of the disk 13.

Figure 3:
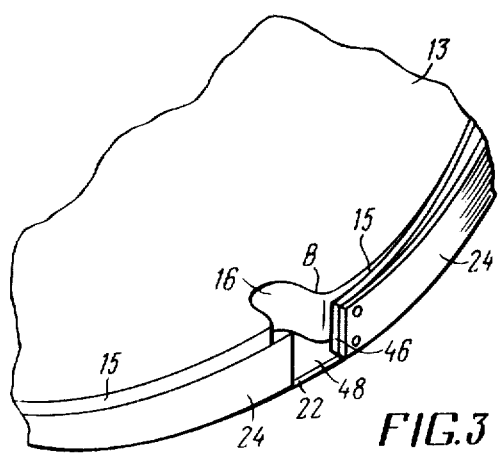
FIG. 3 shows part of the rotor viewed from the stationary guide.

For the purpose of keeping the lamp cap vertically in the slot 16, a spring 46 and a spring 47 are fitted in the portion of the rotor travel which carries the lamp caps to the conveyor cells 12. One end of the spring 46 (FIG. 3) is attached to the shoulder 24 of the plate 22, the spring being located in a vertical plane between the side 15 of the disk 13 and the shoulder 24 of the plate 22. The spring 47 (FIGS. 1 and 2) is made in the form of a flat half-ring located above the disk 13. One end of the spring 47 is attached to the bracket 23 mounted on the cover 20. The spring 47 is located in a horizontal plane for the purpose of limiting the vertical movement of the lamp cap 5 in the slot 16.

To permit the lamp cap 5 free passage from the guide 4 (FIG. 3) into the slot 16, an opening 48 is provided in the shoulder 24 of the plate 22.

The means 31 (FIG. 1) for positively moving the lamp cap from the stationary guide 4 into the slot 16 of the disk 13 is essentially compressed air supplied through a pipe 49 from a compressed air system (not shown). The pipe 49 is attached to the guide 4 by means of any connecting element 50 known in the art and is provided with a nozzle 51 arranged to deliver compressed air in two streams.

The mechanism which constitutes the present invention operates as follows:

Before loading, the lamp caps 5 are accumulated in the guide 4 wherein they are arranged in a line, one behind the other. The retainer 30 prevents the lamp caps 5 from leaving the guide 4, the retainer rod 35 being positioned in the way.

With the automatic lamp cap smearing installation (not shown) in work, the chain conveyor 11 rotates the sprocket 9, the latter transmitting the movement to the rotor 3. The disk 13 (FIG. 2) of the rotor 3, while rotating, causes the cam 32 to act upon the roller 37 of the retainer 30. Riding on the cam, the roller 37 causes the lever 36 to turn the body 34. The rod 35 mounted on the body 34 turns therewith, permitting the lamp cap 5 to leave the guide 4. Meanwhile one of the slots 16 provided in the disk 13 arrives at the guide 4 and the air streams discharged from the nozzle 51 force the lamp cap 5 (FIG. 1) to move through the opening 48 (FIG. 3) into the slot 16. The lamp cap enters the slot rapidly by virtue of sliding on the curvature B of the slot side wall 45.

Now the cam 32 disengages from the roller 37 (FIG. 2), the body 34 turns under the action of the spring 43 and the rod 35 returns into the initial position between the disk 13 and the guide 4. During the rotation of the disk 13 the lamp caps 5 accommodated in the slots 16 slide on the plate 22 located underneath, being carried by the disk 13 to the chain conveyor cells 12, the springs 45 and 47 keeping the lamp caps upright.

When the lamp cap 5 arrives at the end of the plate 22 or to the hole provided therein, whichever the case may be, it drops into the cell 12.

Each lamp cap is transported by any of the slots 16 in the same manner.

What is claimed is:

1. A mechanism for loading lamp caps into the cells of an endless chain conveyor, comprising: a stationary guide arranged to accommodate lamp caps in a line, one behind the other; a rotor adapted to be driven from said chain conveyor and designed to carry lamp caps to the chain conveyor cells; radial slots provided in said rotor for the purpose of accommodating lamp caps being carried to the chain conveyor cells; a stationary plate located underneath the rotor to serve as a bottom cover of the rotor slots in the portion of the rotor travel which carries lamp caps to the chain conveyor cells; a shoulder provided on said stationary plate and arranged to extend over the side of the rotor so as to prevent lamp caps from dropping out of the rotor slots; a spring-loaded retainer provided between the rotor and the stationary guide for the purpose of retaining lamp caps in said guide, said retainer being adapted to be positively moved out of the retaining position at periodic intervals, when a rotor slot arrives at said guide; a means for positively moving lamp caps from said stationary guide into the rotor slots; cams provided on said rotor for the purpose of periodically acting upon said retainer in order to move it out of the retaining position and thereby permit lamp caps to be positively moved into the rotor slots by said means.

2. A mechanism as claimed in claim 1, in which one of the walls of each rotor slot is curved in the direction of rotor movement, the curvature being formed so as to blend smoothly with the rotor side.

3. A mechanism as claimed in claim 2, in which two flat springs are provided in the portion of the rotor travel which carries lamp caps to the chain conveyor cells, one of said springs being attached to the shoulder of the stationary plate and located in a vertical plane between the rotor side and said shoulder for the purpose of keeping the lamp cap upright in the rotor slot, and the other flat spring being attached to a fixedly mounted bracket and located in a horizontal plane above the rotor slots for the purpose of limiting the vertical movement of the lamp cap in the rotor slot.

4. A mechanism as claimed in claim 1, in which the retainer has a pivot pin fixedly mounted on a bracket and a body which is rotatably mounted on said pivot pin and amounts a rod located between the rotor and the stationary guide and a lever carrying a roller and adapted to be periodically acted upon by the rotor cams.

5. A mechanism as claimed in claim 1, in which the means for positively moving lamp caps comprises a pipe which has a nozzle and is connected to a system supplying compressed air for moving lamp caps.

* * * * *